United States Patent [19]

Takahashi et al.

[11] Patent Number: 4,845,068

[45] Date of Patent: Jul. 4, 1989

[54] CATALYSTS FOR HYDROTREATING HYDROCARBONS AND METHOD OF ACTIVATING THE SAME

[75] Inventors: Yasuhito Takahashi, Narashino; Shigeru Sakai, Ichikawa; Yoshimasa Inoue, Matsudo, all of Japan

[73] Assignee: Sumitomo Metal Mining Company Limited, Tokyo, Japan

[21] Appl. No.: 184,958

[22] Filed: Apr. 22, 1988

[30] Foreign Application Priority Data

| Apr. 22, 1987 | [JP] | Japan | 62-99313 |
| Jun. 12, 1987 | [JP] | Japan | 62-145141 |
| Jun. 12, 1987 | [JP] | Japan | 62-145142 |
| Jun. 12, 1987 | [JP] | Japan | 62-145143 |
| Jun. 12, 1987 | [JP] | Japan | 62-145144 |

[51] Int. Cl.$^4$ .................. B01J 31/34; B01J 31/28; B01J 27/049; B01J 27/188
[52] U.S. Cl. .................. 502/168; 208/216 R; 502/210; 502/211; 502/213; 502/219; 502/220; 502/221; 502/222
[58] Field of Search ............... 502/168, 220, 219, 210, 502/211, 213, 221, 222

[56] References Cited

U.S. PATENT DOCUMENTS

| 3,477,963 | 11/1969 | Van Venrooy | 502/220 |
| 3,972,829 | 8/1976 | Michalko | 502/168 |
| 4,530,917 | 7/1985 | Berreri | 502/219 |
| 4,588,706 | 5/1986 | Kukes et al. | 502/210 |
| 4,636,487 | 1/1987 | Parrott | 502/168 |
| 4,719,195 | 1/1988 | Toulboat et al. | 502/220 |
| 4,725,569 | 2/1988 | Tuszynski et al. | 502/168 |

Primary Examiner—Paul E. Konopka
Attorney, Agent, or Firm—Watson, Cole, Grindle & Watson

[57] ABSTRACT

Supported catalysts for hydrotreating hydrocarbons comprise (a) at least one member selected from the group consisting of oxides of metals in Groups IV and VIII of the Periodic Table, and (b) at least one organic compound having a mercapto radical or radicals (—SH) selected from the group consisting of mercaptocarboxylic acids, including alkali metal, alkaline earth metal and ammonium salts thereof and esters thereof, bivalent mercaptans, amino-substituted mercaptans, and thiocarboxylic acids. These catalysts can be easily activated by treatment in the presence of hydrogen gas at a temperature in the range from room temperature to 400° C. show higher activity than catalysts activated by conventional methods.

17 Claims, No Drawings

CATALYSTS FOR HYDROTREATING HYDROCARBONS AND METHOD OF ACTIVATING THE SAME

BACKGROUND OF THE INVENTION

1. Field of the Invention

This invention relates to catalysts for hydrotreating hydrocarbon oil that can be easily activated, and to a method of activating the same.

2. Description of the Prior Art

For the so-called hydrotreatment process (treatment of hydrocarbon oil in the presence of hydrogen to effect hydrogenation, hydrodesulfurization, hydrodenitrification and hydrogenolysis), catalysts have been used which comprise, as an active ingredient, at least one member selected from the group consisting of the metals in Groups VI and VII of the Periodic Table, these metals being supported on an inorganic oxide carrier, such as alumina, silica-alumina and titania. Molybdenum and tungsten are frequently used as the Group VI metal, and cobalt and nickel are often employed as the Group VIII metal.

These metals, usually supported on a carrier in the form of inactive oxide, must be activated before use by presulfiding i.e., for conversion from the oxide to the sulfide form.

This presulfiding is generally effected by charging the catalyst to be activated in a reactor for hydrotreatment of hydrocarbon oil and passing a sulfurizing agent together with hydrogen gas through the catalyst bed. The conditions of this presulfiding vary with the type of intended hydrotreatment process and the kind of sulfurizing agent used. When hydrogen sulfide is employed as the sulfurizing agent, it is diluted with hydrogen gas to a concentration of about 0.5 to 5 volume % and the resulting gaseous mixture is passed at a temperature higher than 180° C. (usually higher than 250° C.) in an amount of 1000 to 3000 liters (at standard temperature and pressure) for 1 liter of catalyst. When carbon disulfide, n-butylmercaptan, dimethyl sulfide or dimethyl disulfide is used, it is diluted before use with light hydrocarbon oil and sulfurization is carried out at a temperatue of 250 to 350° C., under a pressure of 20 to 100 Kg/cm$^2$, at a liquid space velocity of 0.5 to 2 hr$^{-1}$ and with a hydrogen/oil ratio of 200 to 1000 Nl/l. After finishing this presulfiding of catalyst, feedstock to be treated is fed to the reactor to start the hydrotreatment process.

This presulfiding step, on which successful operation of the succeeding hydrotreatment process depends, must be performed with great care by using proper materials. When a diluent is used, for example, a hydrocarbon oil containing no olefin must be selected, as otherwise the catalyst is poisoned by the polymeric substances formed from the olefins contained. In addition, heavy oil is unsuitable as the diluent because of its poor wetting on the catalyst surface due to its high viscosity. As a result, light hydrocarbon oil has to be used as the diluent, leading to an increase in production cost. Furthermore, the sulfurizing agent must be used in a relatively large amount to prevent the catalyst reduction from being inactivated by the reaction with hydrogen at high temperatures, and hence the weight ratio of sulfurizing agent to hydrogen must be maintained at a proper level throughout the presulfiding process. This preliminary step is rarely automated, and requires unusual and cumbersome operations, imposing a heavy burden on the operators. Thus, how to eliminate this presulfiding step, or how to minimize the cumbersome operations involved, has been a subject of major concern.

A method to meet this demand was recently proposed, which comprises impregnating a supported catalyst of an active metal with a polysulfide represented by the general formula of R—S$_n$—R' (wherein n is an integer of 3 to 20, and R and R' are each hydrogen atom or an organic group of 1 to 150 carbon atoms), and heat-treating the polysulfide-impregnated catalyst in the absence of hydrogen gas at a temperature of 65° to 275° C. and under a pressure of 0.5 to 70 bar; Japanese Patent Kokai No. 111144 (1986). This method, in which the active metal is sulfurized by the polysulfide contained in the catalyst upon heating, eliminates the use of any sulfurizing agent and a diluent therefor when presulfiding is allowed to proceed inside the reactor, thus simplifying the operation. This method also makes it possible to effect presulfiding outside the reactor and to start the hydrotreatment process immediately after the sulfurized catalyst is charged in the reactor. However, the polysulfide has to be used in the form of a solution in an organic solvent for impregnation, and hence a special contrivance is needed for the use of organic solvents in carrying out the impregnation process.

SUMMARY OF THE INVENTION

The object of this invention is to eliminate the aforementioned problems associated with the conventional catalysts, and to provide a new catalyst for hydrotreating hydrocarbon oil that can be easily sulfurized for activation and a method of activating the same.

Comprehensive studies to find new sulfurizing agents easier to handle than the above-mentioned polysulfides have led us to find that organic compounds having mercapto radical (—SH) are best suited for the purpose. This invention was accomplished based on these findings.

Thus, the first aspect of this invention relates to a catalyst for hydrotreating hydrocarbons supported on an inorganic oxide carrier, which comprises (a) at least one member selected from the group consisting of oxides of metals in Groups VI and VIII of the Periodic Table, and (b) at least one organic compound having a mercapto radical or radicals (—SH) selected from the group consisting of mercapto-carboxylic acids represented by the general formula, HS—(CH$_2$)$_n$—COOR (wherein n is an integer of 1 to 3; and R denotes hydrogen atom, an alkali metal, an alkaline earth metal, ammonium group, or a linear, branched or naphthene hydrocarbonaceous radical of 1 to 10 carbon atoms); bivalent mercaptans represented by the general formula, HS—R'—SH (wherein R' is a bivalent hydrocarbonaceous radical); aminosubstituted mercaptans represented by the general formula, H$_2$N—R'—SH (wherein R' is as defined above); and thiocarboxylic acids represented by the general formula, R"—COSH (wherein R" is a monovalent hydrocarbonaceous radical). The second aspect of this invention relates to a method of activating the catalyst as defined above which comprises treating it in the presence of hydrogen gas at a temperature in the range from room temperature to 400° C.

DESCRIPTION OF THE PREFERRED EMBODIMENTS

As is well known, alumina, silica-alumina, titania and others are used as the inorganic oxide carrier for catalysts of this type. Of these, alumina and silica-alumina are the most typical examples.

It is also known that molybdenum and/or tungsten are preferable as the active metal of Group VI, and cobalt and/or nickel are preferred examples of the active metal of Group VIII. The oxides of these metals may be used either alone or in combination.

The catalyst of this invention may also contain, as active component, an oxided of phosphorus in addition to oxides of Group VI and Group VIII metals. Phosphorus may be deposited on the carrier either separately or simultaneously with the active metals. In the latter case in which a solution containing all the active components is used for impregnation, the largest possible amount of phosphorus that can be included in the catalyst is 8 weight % as $P_2O_5$ because the treating solution becomes more viscous as its phosphorus content increases, making impregnation increasingly less effective.

As preferable examples of the sulfurizing agents, there may be mentioned the following compounds: mercapto-carboxylic acids represented by the general formula, $HS-(CH_2)_n-COOR$ (wherein n is an integer of 1 to 3; and R denotes hydrogen atom, an alkali metal, an alkaline earth metal, ammonium group, or a linear, branched or naphthene hydrocarbonaceous radical of 1 to 10 carbon atoms), such as mercaptoacetic acid ($HSCH_2COOH$), β-mercaptopropionic acid ($HSCH_2CH_2COOH$), alkali metal, alkaline earth metal salts thereof, methyl mercaptoacetate ($HSCH_2COOCH_3$), ethyl 2-mercaptoacetate ($HSCH_2COOC_2H_5$), 2-ethylhexyl thioglycollate ($HSCH_2COOC_8H_{17}$) and methyl 3-mercaptopropionate $HSCH_2CH_2COOCH_3$; bivalent mercaptans represented by the general formula, $HS-R'-SH$ (wherein R' is a bivalent hydrocarbonaceous radical), such as ethanedithiol ($HSCH_2CH_2SH$) and 1,4-butanedithiol ($HS(CH_2)_4SH$); amino-substitued mercaptans represented by the general formula, $H_2N-R'-SH$ (wherein R' is as defined above), such as 2-aminoethanethiol ($H_2NCH_2CH_2SH$) and 4-aminothiophenol ($H_2NC_6H_4SH$); and thiocarboxylic acids represented by the general formula, $R''-COSH$ (wherein R'' is a monovalent hydrocarbonaceous radical), such as thioacetic acid ($CH_3COSH$) and thiobenzoic acid ($C_6H_5COSH$).

A solution of the above-mentioned sulfurizing agent (mercapto-carboxylic acids and others) is soaked by impregnation into an inorganic carrier bearing at least one member selected from the metals in Groups VI and VIII of the Periodic Table. In this case, use of an aqueous solution is most advantageous in terms of cost.

The preferable amount of sulfurizing agent (mercapto-carboxylic acids and others) to be included is 1 to 3 equivalent proportions based on the weight required for converting the Group VI and/or VIII metals to a sulfurized state highly active for hydrogenation (for example, $MoS_2$, $WS_2$, CoS and NiS). A smaller amount results in lower catalytic activity, while use of a larger amount is uneconomical because no marked enhancement of activity can be expected.

Some catalysts soaked with a solution of sulfurizing agent show activity without any further treatment; in other cases, however, activity can be exhibited by removing the solvent used for dissolving the sulfurizing agent, followed by treatment in the presence of hydrogen gas at a temperature in the range from room temperature to 400° C. (the solvent removal may be performed during the activation step in the presence of hydrogen gas).

During the activation step in the presence of hydrogen gas, the sulfurizing agent attached to the active metal through coordinate bonding undergoes hydrogenolysis, converting the metal component into a sulfided form which is an active species for hydrogenation. In effecting this activation process, there is no specific limitation upon the reaction pressure, and presence of hydrocarbons in the reaction system causes no problem. Hence, this step may be carried out in the reactor used for hydrocarbon hydrotreatment or in a separate activation apparatus.

Activation is conducted at a temperature in the range from room temperature to 400° C., preferably in the range from 100° to 300° C. A treating temperature higher than 400° C. results in lowered catalytic activity.

The catalysts prepared by the method of this invention show higher activity in hydrodesulfurization of hydrocarbon oil than those sulfurized by the conventional method. The reason is not absolutely clear yet, but it may be assumed that the sulfurizing agent used herein (mercapto-carboxylic acids and others) is attached to the Group VI and/or VIII metal through coordinate bonding and this is effective in forming the metal sulfides favorable in the succeeding activation step.

The following Examples and Comparative Examples will further illustrate the invention.

EXAMPLE 1

Twenty grams of a commericial catalyst containing 15 weight % of $MoO_3$ and 4 weight % of CoO supported on γ-alumina (KF-742; product of Nippon Ketjon Co., Ltd.) was thoroughly impregnated with 12 ml of an aqueous solution containing 6.0 g mercaptoacetic acid ($d^{20}$:1.33) and dried at 80° C. for 16 hours, giving catalyst $A_1$. Catalysts $A_2$ and $A_3$ were prepared in much the same manner as above, except that 9.0 g and 12.0 g of mercaptoacetic acid were used, respectively. Catalyst $A_4$ was prepared by impregnating 20 g of the commercial catalyst (KF-742) with 12 ml of an aqueous solution containing 7.5 g mercaptoacetic acid, drying at 80° C. for 16 hours, and repeating the impregnation and drying steps once again.

The amounts of mercaptoacetic acid loaded on catalysts $A_1$, $A_2$, $A_3$ and $A_4$ were respectively 1.2, 1.8, 2.4 and 3.0 times the theoretical amount required to convert the two metals into $MoS_2$ CoS.

Separately, 500 g of an alumina carrier (specific surface area: 310 m²/g; pore volume: 0.70 ml/g) used in KF-742 was impregnated with a solution prepared from 111 g ammonium paramolybdate, 101 g nickel nitrate hexahydrate 150 g conc. ammonia water and water, dried at 110° C. for 16 hours and calcined at 500° C. for two hours, giving a catalyst containing 15 weight % of $MoO_3$ and 4 weight % of NiO. This base catalyst was then treated in the same manner as above to include varying amounts of mercaptoacetic acid, affording $A_5$, $A_6$, $A_7$ and $A_8$.

The amounts of mercaptoacetic acid loaded on catalysts $A_5$, $A_6$, $A_7$ and $A_8$ were respectively 1.2, 1.8, 2.4 and 3.0 times the theoretical amount required to convert the two metals into $MoS_2$ and NiS.

In addition, 20 g of the commercial catalyst (KF-742) was thoroughly impregnated with 12 ml of an aqueous solution containing 10.0 g mercaptopropionic acid ($d^{20}$:1.22) and dried at 80° C. for 16 hours, giving catalyst $A_9$.

The amount of mercaptopropionic acid includes in this catalyst was 1.8 times the theoretical amount required to convert the two metals into $MoS_2$ and CoS.

(Activation)

Three milliliters each of the catalysts prepared above ($A_1, A_2, A_3, A_4, A_5, A_6, A_7$ and $A_8$) was charged in a fixed-bed flow reactor made of stainless steel and activated under the conditions shown below.
  Amount of catalyst: 3 ml
  Pressure: Atmospheric pressure
  Hydrogen flow rate: 4.8 Nl/hr
  Reaction time: 3 hours
  Reaction temperature: 200° C.

(Activity evaluation)

The catalysts thus activated were used for hydrodesulfurization of straight-run gas oil distilled from Kuwait crude oil: hereinafter abbreviated as KSRGO. For catalyst $A_2$, the substance not subjected to the activation process (referred to as catalyst $A'_2$) was also tested in the same way as above. The properties of the KSRGO used for the reaction were:
  Specific gravity (15/4° C.): 0.848
  Sulfur (% by weight): 1.61
  Nitrogen (ppm by weight): 157
  Initial boiling point (°C.): 211
  50 vol-% boiling point (°C.): 340
  Final boiling point (°C.): 406

The reaction was conducted under the conditions shown below using a fixed-bed reactor.
  Amount of catalyst: 3 ml
  Liquid space velocity of feed oil: 2.0 hr$^{-1}$
  Pressure (hydrogen pressure): 30 kg/cm$^2$
  Reaction temperature: 330° C.
  Hydrogen/oil ratio: 300 Nl/l
  Reaction time: 8 hours Hydrotreated oil samples were taken from reactor at an interval of two hours for determination of sulfur content. The average desulfurization rate obtained from the oil analysis for 4 hours, 6 hours and 8 hours after the start of reaction is shown in Table 1.

COMPARATIVE EXAMPLE 1

The catalysts of $MoO_3/CoO$ and $MoO_3/NiO$ types (hereinafter abbreviated as Mo/Co and Mo/Ni types) used in Example 1 and 2 were subjected to presulfiding using n-butylmercaptan diluted with KSRGO, and tested for hydrodesulfurization activity.

(Sulfurizing treatment)
  Sulfurizing agent: 3 wt-% n-butylmercaptan in KSRGO
  Amount of catalyst: 3 ml
  Liquid space velocity of feed oil: 2.0 hr$^{-1}$
  Reaction pressure: 30 Kg/cm$^2$
  Reaction temperature: 316° C.
  Hydrogen/oil ratio: 300 Nl/l
  Reaction time: 8 hours (Activity evaluation)

Catalytic activity was evaluated under the same conditions as in Example 1. The average desulfurization rate for 4 hours, samples taken 4 hours, 6 hours and 8 hours after the start of reaction is shown in Table 1.

For both of the Mo/Co and Mo/Ni types, catalysts containing mercaptoacetic acid or mercaptopropionic acid showed higher activity than those sulfurized with a mixture of 3 weight % n-butylmercaptan and KSRGO. With the catalysts of Mo/Co type, addition of mercaptoacetic acid in an amount of 1.2 times, the theoretical weight required to convert the two metals into $MoS_2$ and CoS suffices, with no marked enhancement of activity being observed with a larger amount. Catalyst $A'_2$ was slightly lower in activity than catalyst $A_2$, but slowed higher activity than catalysts sulfurized with n-butylmercaptan by the conventional method. With the catalysts of Mo/Ni type, on the other hand, the optimum amount of mercaptoacetic acid to be added was somewhat larger than with catalysts of Mo/Co type, but did not exceed a level of 1.8 times the theoretical weight.

Results of Activity Evaluation Using KSRGO

Table 1-(1) (Mo/Co type)

| Catalyst | $A_1$ | $A_2$ | $A_2'$ | $A_3$ | $A_4$ | Sulfurized with n-BM(*) |
|---|---|---|---|---|---|---|
| Content of mercaptoacetic acid(**) | ×1.2 | ×1.8 | ×1.8 | ×2.4 | ×3.0 | — |
| Rate of desulfurization (%) | 88.2 | 87.5 | 86.7 | 87.3 | 87.3 | 82.7 |

Table 1-(2) (Mo/Ni type)

| Catalyst | $A_5$ | $A_6$ | $A_7$ | $A_8$ | Sulfurized with n-BM(*) |
|---|---|---|---|---|---|
| Content of mercaptoacetic acid(**) | ×1.2 | ×1.8 | ×2.4 | ×3.0 | — |
| Rate of desulfurization (%) | 81.2 | 84.2 | 83.9 | 83.7 | 79.1 |

Table 1-(3) (Mo/Co type)

| Catalyst | $A_9$ | Sulfurized with n-BM(*) |
|---|---|---|
| Content of mercaptopropionic acid(**) | ×1.3 | — |
| Rate of desulfurization(%) | 87.5 | 82.7 |

(*)Sulfurized with 3 wt % n-butylmercaptan in KSRGO.
(**)Factor based on the theoretical weight required for conversion into $MoS_2$, CoS and NiS.
[The same applies to the subsequent tables for (*) and (**).]

EXAMPLE 2

One hundred grams of γ-alumina carrier (specific surface area: 280 m$^2$/g; pore volume: 0.75 ml/g) was impregnated with 80 ml of an aqueous solution prepared from 29.0 g molubdenum trioxide, 10.5 g nickel carbonate (Ni content: 43.3%), 16.5 g of 85% phosphoric acid and water, dried at 110° C. for 16 hours and calcined at 500° C. for two hours, giving a catalyst containing 20 weight % of $MoO_3$, 4 weight % of NiO and 7 weight % of $P_2O_5$. This base catalyst (20 g) was thoroughly impregnated with 10 ml of an aqueous solution containing 7.3 g mercaptoacetic acid and dried at 100° C. for 16 hours, affording catalyst $B_1$.

Catalysts $B_2$ and $B_3$ were prepared in much the same maner as above, except that 11.0 g and 14.6 g of 100% mercaptoacetic acid were used, respectively, in place of the aqueous solution.

The amounts of mercaptoacetic acid loaded on catalysts $B_1$, $B_2$ and $B_3$ were respectively 1.0, 1.5 and 2.0 times the theoretical amount required to convert the two metals into $MoS_2$ and NiS.

Separately, 20 g of the calcined catalyst prepared above was thoroughly impregnated with an aqueous solution containing 11.7 g mercaptopropionic acid and dried at 100° C. for 16 hours, giving catalyst $B_4$. The amount of mercaptopropionic acid loaded on this catalyst was 1.5 times the theoretical amount required to convert the two metals into $MoS_2$ and NiS.

(Activity evaluation)

Catalysts $B_1$, $B_2$, $B_3$ and $B_4$ were used for hydrodesulfurization of KSRGO without being activated under the same conditions as in Example 1. The average desulfurization rates are shown in Table 2.

COMPARATIVE EXAMPLE 2

The base catalyst of $MoO_3/NiO/P_2O_5$ type (hereinafter abbreviated as Mo/Ni/P type) used in Example 2 was sulfurized in the same manner as in Comparative Example 2, and used for hydrodesulfurization of KSRGO in the same way as in Example 1. The average desulfurization rate is also shown in Table 2.

TABLE 2

Results of Activity Evaluation Using KSRGO

| Catalyst | $B_1$ | $B_2$ | $B_3$ | $B_4$ | Sulfurized with n-BM(*) |
|---|---|---|---|---|---|
| Content of sulfurizing agent (**) | $HSCH_2COOH$ ×1.0 | ×1.5 | ×2.0 | $HSCH_2CH_2COOH$ ×1.5 | — |
| Rate of desulfurization (%) | 89.6 | 93.5 | 93.0 | 93.4 | 73.5 |

The catalysts containing mercaptoacetic acid or mercaptopropionic acid showed higher activity than the catalyst sulfurized with a mixture of 3 weight % n-butylmercaptan and KSRGO. Data of the catalysts containing mercaptoacetic acid indicate that addition of the acid in an amount of 1.5 times the theoretical weight required to convert the two metals into $MoS_2$, NiS and CoS suffices, with no marked enhancement of activity being observed with larger amounts.

Excessively large amounts of sulfurizing agent included in a catalyst not only results in its waste, but also requires two or more steps for impregnation.

EXAMPLE 3

Twenty grams of commercial catalyst (the same type as used in Example 1) thoroughly impregnated with 10.4 g of 100% methyl mercaptoacetate and dried at 80° C. for 16 hours, giving catalyst $C_1$. Catalyst $C_2$ was prepared in much the same manner as above, except that 11.7 g of ethyl mercaptoacetate was used as sulfurizing agent. Catalyst $C_3$ was prepared by impregnating 20 g of the above commercial catalyst with 20.0 g of 2-ethylhexyl mercaptoacetate, drying at 80° C. for 16 hours, and repeating the impregnation and drying steps once again.

The amounts of mercaptoacetate loaded on catalysts $C_1$, $C_2$ and $C_3$ were 1.8 times the theoretical amount required to convert the two metals into $MoS_2$ and CoS.

Separately, the same commercial catalyst as above was thoroughly impregnated with 11.7 g of methyl 3-mercaptopropionate and dried at 80° C. for 16 hours, giving catalyst $C_4$. The amount of methyl 3-mercaptopropionate loaded on this catalyst was 1.8 times the theoretical amount required to convert the two metals into $MoS_2$ and CoS.

In addition, 500 g of alumina carrier (the same type as used in Example 1 for the preparation of catalysts $A_5$ through $A_8$) was impregnated with a solution prepared from 111 g ammonium paramolybdate, 101 g nickel nitrate hexahydrate and 150 g conc. ammonia water, dried at 110° C. for 16 hours and calcined at 500° C. for two hours, giving a catalyst containing 15 weight % of $MoO_3$ and 4 weight % of NiO. This base catalyst was then activated in the same manner as in Example 1 to include 10.4 g methyl mercaptoacetate, 11.7 g ethyl mercaptoacetate or 20.0 g 2-ethylhexyl mercaptoacetate, affording catalysts $C_5$, $C_6$ and $C_7$, respectively.

The amounts of mercaptoacetate loaded on these catalysts were 1.8 times the theoretical amount required to convert the two metals into $MoS_2$ and NiS.

Furthermore, 20 g of the above base catalyst was thoroughly impregnated with 11.7 g methyl 3-mercaptopropionate and dried at 80° C. for 16 hours, giving catalyst $C_8$.

The amount of methyl 3-mercaptopropionate loaded on this catalyst was 1.8 times the theoretical amount required to convert the two metals into $MoS_2$ and NiS.

Catalysts $C_1$, $C_2$, $C_3$, $C_4$, $C_5$, $C_6$, $C_7$ and $C_8$ prepared above were activated in the same manner as in Example 1 and used for hydrodesulfurization of KSRGO under the same conditions. The average desulfurization rates are shown in Table 3.

COMPARATIVE EXAMPLE 3

The catalysts of Mo/Co and Mo/Ni types used in Example 3 were sulfurized in the same manner as in Comparative Example 1, and used for hydrosulfurization of KSRGO in the same way as in Example 1. The average desulfurization rates are also shown in Table 3.

For both of the Mo/Co and Mo/Ni types, catalysts, containing a mercaptoacetate or mercaptopropionate showed nearly the same activity as those sulfurized with a mixture of 3 weight % n-butylmercaptan and KSRGO.

EXAMPLE 4

One hundred grams of γ-alumina carrier (the same type as used in Example 2) was impregnated with 80 ml of a solution prepared from 29.0 g molybdenum trioxide, 10.5 g nickel carbonate (Ni content: 43.3%), 16.5 g 85% of phosphoric acid and water, dried at 110° C. for 16 hours and calcined at 500° C. for two hours, giving a catalyst containing 20 weight % $MoO_3$, 4 weight % NiO and 7 weight % $P_2O_5$. This base catalyst (30 g) was then impregnated with

TABLE 3

| Catalyst | $C_1$ | $C_2$ | $C_3$ | $C_4$ | (Mo/Co type) Sulfurized with n-BM(*) |
|---|---|---|---|---|---|
| Mercapto- | Methyl mer- | Ethyl mer- | 2-Ethylhexyl | Methyl 3-mer- | |

TABLE 3-continued

| carboxylate Amount(**) | captoacetate × 1.8 | captoacetate × 1.8 | mercaptoacetate × 1.8 | captopropionate × 1.8 | |
|---|---|---|---|---|---|
| Rate of desulfurization (%) | 82.2 | 82.7 | 83.3 | 83.7 | 82.7 |

| Catalyst | $C_5$ | $C_6$ | $C_7$ | $C_8$ | Sulfurized with n-BM(*) |
|---|---|---|---|---|---|
| Mercaptocarboxylate Amount(**) | Methyl mercaptoacetate × 1.8 | Ethyl mercaptoacetate × 1.8 | 2-Ethylhexyl mercaptoacetate × 1.8 | Methyl 3-mercaptopropionate × 1.8 | — |
| Rate of desulfurization (%) | 78.9 | 80.8 | 79.7 | 79.3 | 79.1 |

TABLE 4

| Catalyst | $D_1$ | $D_2$ | $D_3$ | $D_4$ | (Mo/Ni/P type) Sulfurized with n-BM(*) |
|---|---|---|---|---|---|
| Mercaptocarboxylate Amount(**) | Methyl mercaptoacetate × 1.5 | Ethyl mercaptoacetate × 1.5 | 2-Ethylhexyl mercaptoacetate × 1.5 | Methyl 3-mercaptopropionate × 1.5 | — |
| Rate of desulfurization (%) | 80.3 | 78.9 | 80.8 | 76.7 | 73.5 |

15.8 g methyl mercaptoacetate and dried at 100° C. for 16 hours, affording catalyst $D_1$. Catalyst $D_2$ was prepared in much the same maner as above, except that 17.9 g of ethyl mercaptoacetate was used in place of methyl mercaptoacetate. Catalyst $D_3$ was prepared by impregnating the base catalyst (30 g) with 35.8 g 2-ethylhexyl mercaptoacetate, drying at 100° C. for 16 hours, and repeating the impregnation and drying steps once again.

The amounts of mercaptoacetate loaded on catalysts $D_1$, $D_2$ and $D_3$ were 1.5 times the theoretical amount required to convert the two metals into $MoS_2$ and NiS.

In addition, catalyst $D_4$ was prepared by impregnating the above base catalyst (30 g) with 21.0 g methyl 3-mercaptopropionate and drying at 100° C. for 16 hours. The amount of methyl 3-mercaptopropionate loaded on this catalyst was 1.5 times the theoretical amount required to convert the two metals into $MoS_2$ and NiS.

Catalysts $D_1$, $D_2$, $D_3$ and $D_4$ prepared above were used for hydrodesulfurization of KSRGO without being activated under the same conditions as in Example 2. The average rates of desulfurization are shown in Table 4.

COMPARATIVE EXAMPLE 4

The base catalyst of Mo/Ni/P type used in Example 4 was sulfurized in the same manner as in Comparative Example 2 and used for hydrodesulfurization of KSRGO in the same way as in Example 1. The average rate of desulfurization is also shown in Table 4.

The catalysts of Mo/Ni/P type containing a mercaptoacetate or mercaptopropionate showed higher activity than the catalyst sulfurized with a mixture of 3 weight % n-butylmercaptan and KSRGO.

EXAMPLE 5

Thirty grams of commercial catalyst containing 17 wt % of $MoO_3$ and 4 wt % of CoO supported on γ-alumina (KF-707: product of Nippon Ketjen Co. Ltd.) was impregnated with 15 ml of ethanolic solution containing 7.9 g ethanedithiol or 10.2 g 1,4-butanedithiol, and dried at 80° C. for 16 hours, giving catalysts $E_1$ and $E_2$, respectively.

The amounts of dithiol loaded on these catalysts were 1.8 times the theoretical amount required to convert the two metals into $MoS_2$ and CoS.

Catalysts $E_1$ and $E_2$ prepared above were activated in the same manner as in Example 1 and used for hydrodesulfurization of KSRGO under the same conditions. The average rates of desulfurization are shown in Table 5.

COMPARATIVE EXAMPLE 5

The base catalyst of Mo/Co type used in Example 5 was sulfurized in the same manner as in Comparative Example 2 and used for hydrodesulfurization of KSRGO in the same way as in Example 1. The rate of desulfurization is also shown in Table 5.

TABLE 5

| Catalyst | $E_1$ | $E_2$ | Sulfurized with n-BM(*) |
|---|---|---|---|
| Bivalent mercaptan Amount(**) | Ethanedithiol ×1.8 | 1,4-Butanedithiol ×1.8 | — |
| Rate of desulfurization (%) | 90.1 | 86.9 | 81.5 |

The catalysts of Mo/Co type containing ethanedithiol or 1,4-butanedithiol showed higher activity than the catalyst sulfurized with a mixture of 3 weight % n-butylmercaptan and KSRGO.

EXAMPLE 6

One hundred grams of γ-alumina carrier (the same type as used in Example 2) was impregnated with 80 ml of a solution prepared from 29.0 g molybdenum trioxide, 10.5 g nickel carbonate (Ni content: 43.3%), 16.5 g of 85% phosphoric acid and water, dried at 110° C. for 16 hours and calcined at 500° C. for two hours, giving a catalyst containing 20 weight % $MoO_3$, 4 weight % NiO and 7 weight % $P_2O_5$. This base catalyst (30 g) was then impregnated with 12 ml of ethanolic solution containing 7.0 g ethanedithiol or 9.1 g 1,4-butanedithiol, and dried at 100° C. for 16 hours, affording catalysts $F_1$ and $F_2$, respectively.

The amounts of dithiol loaded on these catalysts were 1.5 times the theoretical amount required to convert the two metals into $MoS_2$ and NiS.

Catalysts F₁ and F₂ prepared above were used for hydrodesulfurization of KSRGO without being activated under the same conditions as in Example 1. The average rates of desulfurization are shown in Table 6.

COMPARATIVE EXAMPLE 6

The base catalyst of Mo/Ni/P type used in Example 6 was sulfurized in the same manner as in Comparative Example 2 and used for hydrodesulfurization of KSRGO in the same way as in Example 1. The rate of desulfurization is also shown in Table 6.

TABLE 6

| Catalyst | $F_1$ | $F_2$ | Sulfurized with n-BM(*) |
|---|---|---|---|
| Bivalent mercaptan | Ethane-dithiol | 1,4-Butane-dithiol | — |
| Amount(**) | ×1.5 | ×1.5 | |
| Rate of desulfurizaion (%) | 94.1 | 90.9 | 73.5 |

The catalysts of Mo/Ni/P type containing ethanedithiol or 1,4-butanedithiol showed higher activity than the catalyst sulfurized with a mixture of 3 weight % n-butylmercaptan and KSRGO.

EXAMPLE 7

Thirty grams of commercial catalyst (the same type as used in Example 5) was impregnated with 13.0 g 2-aminoethanethiol or 20.8 g 4-aminothiophenol, and dried at 80° C. for 16 hours, giving catalysts $G_2$ and $G_2$, respectively.

The amounts of amino-substituted mercaptan loaded on these catalysts were 1.8 times the theoretical amount required to convert the two metals into $MoS_2$ and CoS.

Catalysts $G_1$ and $G_2$ prepared above were activated in the same manner as in Example 1 and used for hydrodesulfurization of KSRGO under the same conditions. The average rates of desulfurization are shown in Table 7.

COMPARATIVE EXAMPLE 7

The base catalyst of Mo/Co type used in Example 7 was sulfurized in the same manner as in Comparative Example 1 and used for hydrodesulfurization of KSRGO in the same way as in Example 1. The rate of desulfurization is also shown in Table 7.

The catalysts of Mo/Co type containing 2-aminoethanethiol or 4-aminothiophenol showed higher activity than that sulfurized with a mixture of 3 weight % n-butylmercaptan and KSRGO.

TABLE 7

| Catalyst | $G_1$ | $G_2$ | Sulfurized with n-BM(*) |
|---|---|---|---|
| Amino-substituted mercaptan | 2-Amino-ethanethiol | 4-Amino-thiophenol | — |
| Amount(**) | ×1.8 | ×1.8 | |
| Rate of desulfurization (%) | 81.7 | 85.0 | 81.5 |

EXAMPLE 8

One hundred grams of γ-alumina carrier (the same type as used in Example 2) was impregnated with 80 ml of a solution prepared from 29.0 g molybdenum trioxide, 10.5 g nickel carbonate (Ni content: 43.3%), 16.5 g of 85% phosphoric acid and water, dried at 110° C. for 16 hours and calcined at 500° C. for two hours, giving a base catalyst containing 20 weight % $MoO_3$, 4 weight % NiO and 7 weight % $P_2O_5$. Catalysts $H_1$ and $H_2$ were prepared by impregnating the base catalyst (30 g) obtained above with 30 ml of aqueous solution containing 11.5 g 2-aminoethanethiol or 18.6 g 4-aminothiophenol, drying at 100° C. for 16 hours, and repeating the impregnation and drying steps onece again.

The amounts of amino-substituted mercaptan loaded on these catalysts were 1.5 times the theoretical amount required to convert the two metals into $MoS_2$ and NiS.

Catalysts $H_1$ and $H_2$ prepared above were used for hydrodesulfurization of KSRGO without being activated under the same conditions as in Example 1. The average rates of.desulfurization are shown in Table 8.

COMPARATIVE EXAMPLE 8

The base catalyst of Mo/Ni/P type used in Example 8 was sulfurized in the same manner as in Comparative Example 1 and used for hydrodesulfurization of KSRGO in the same way as in Example 1. The rate of desulfurization is also shown in Table 8.

TABLE 8

| Catalyst | $H_1$ | $H_2$ | Sulfurized with n-BM(*) |
|---|---|---|---|
| Amino-substituted mercaptan | 2-Amino-ethanethiol | 4-Amino-thiophenol | — |
| Amount(**) | ×1.5 | ×1.5 | |
| Rate of desulfurization (%) | 83.1 | 90.6 | 73.5 |

The catalysts of Mo/Ni/P type containing 2-aminothanethiol or 4-aminothiophenol showed higher activity than the catalyst that sulfurized with a mixture of 3 weight % n-butylmercaptan and KSRGO.

EXAMPLE 9

Thirty grams of commercial catalyst (the same type as used in Example 5) was impregnated with 15 ml of ethanolic solution containing 12.7 g thioacetic acid or 23.0 g thiobenzoic acid, and dried at 80° C. for 16 hours, giving catalysts $I_1$ and $I_2$, respectively.

The amounts of thio-acid loaded on these catalysts were 1.8 times the theoretical amount required to convert the two metals into $MoS_2$ and CoS.

Catalysts $I_1$ and $I_2$ prepared above were activated in the same manner as in Example 1 and used for hydrodesulfurization of KSRGO under the same conditions. The average rates of desulfurization are shown in Table 9.

COMPARATIVE EXAMPLE 9

The base catalyst of Mo/Co type used in Example 7 was sulfurized in the same manner as in Comparative Example 1 and used for hydrodesulfurization of KSRGO in the same way as in Example 1. The rate of desulfurization is also shown in Table 9.

The catalysts of Mo/Co type containing thioacetic acid or thiobenzoicc acid showed higher activity than that sulfurized with a mixture of 3 weight % n-butylmercaptan and KSRGO.

TABLE 9

| Catalyst | $I_1$ | $I_2$ | Sulfurized with n-BM(*) |
|---|---|---|---|
| Thio-acid | Thioacetic acid | Thiobenzoic acid | — |
| Amount(**) | ×1.8 | ×1.8 | |
| Rate of desul- | 85.1 | 82.0 | 81.5 |

TABLE 9-continued

| Catalyst | I₁ | I₂ | Sulfurized with n-BM(*) |
|---|---|---|---|
| furization (%) | | | |

EXAMPLE 10

One hundred grams of γ-alumina carrier (the same type as used in Example 2) was impregnated with 80 ml of a solution prepared from 29.0 g molybdenum trioxide, 10.5 g nickel carbonate (Ni content: 43.3%), 16.5 g of 85% phosphoric acid and water, dried at 100° C. for 16 hours and calcined at 500° C. for two hours, giving a catalyst containing 20 weight % MoO₃, 4 weight % NiO and 7 weight % P₂O₅. This base catalyst (30 g) was impregnated with 15 ml of ethanolic solution containing 11.3 g thioacetic acid or 20.6 g thiobenzoic acid, and dried at 110° C. for 16 hours, giving catalysts J₁ and J₂, respectively.

The amounts of thio-acid loaded on these catalysts were 1.5 times the theoretical amount required to convert the two metals into MoS₂ and NiS.

Catalysts J₁ and J₂ prepared above were used for hydrodesulfurization of KSRGO without being activated under the same conditions as in Example 1. The average rates of desulfurization are shown in Table 10.

COMAPARATIVE EXAMPLE 10

The base catalyst of Mo/Ni/P type used in Example 10 was sulfurized in the same manner as in Comparative Example 1 and used for hydrodesulfurization of KSRGO in the same way as in Example 1. The rate of desulfurization is also shown in Table 10.

TABLE 10

| Catalyst | J₁ | J₂ | Sulfurized with n-BM(*) |
|---|---|---|---|
| Thio-acid | Thioacetic acid | Thiobenzoic acid | — |
| Amount(**) | ×1.5 | ×1.5 | |
| Rate of desulfurization (%) | 74.8 | 90.5 | 73.5 |

The catalysts of Mo/Ni/P type containing thioacetic acid or thiobenzoic acid showed higher activity than that sulfurized with a mixture of 3 weight % n-butylmercaptan and KSRGO.

What is claimed is:

1. A catalyst for hydrotreating hydrocarbons which comprises an inorganic oxide carrier and an active component supported on said inorganic oxide carrier, said active component comprising (a) at least one member selected from the group consisting of oxides of metals in Groups VI and VIII of the Periodic Table, and (b) at least one organic compound having a mercapto radical, said organic compound being present in an amount equal to 1 to 3 equivalent proportions based on the weight required for converting said oxides of metals into sulfides, said organic compound being selected from the group consisting of mercapto-carboxylic acids represented by the following general formula:

HS—(CH₂)ₙ—COOR wherein n is an integer from 1 to 3 and R denotes a hydrogen atom, an alkali metal, an alkaline earth metal, an ammonium group, or a linear, branched or naphthene hydrocarbonaceous radical of 1 to 10 carbon atoms: bivalent mercaptans represented by the following general formula:

HS—R'—SH wherein R' is a bivalent hydrocarbonaceous radical; aminosubstituted mercaptans represented by the following general formula:

H₂N—R'—SH wherein R' is a bivalent hydrocarbonaceous radical; and thiocarboxylic acids represented by the following general formula:

R''—COSH wherein R'' is a monovalent hydrocarbonaceous radical.

2. The catalyst for hydrotreating hydrocarbons as defined in claim 1, wherein said inorganic oxide carrier is made of at least one material selected from the group consisting of alumina, silica-alumina and titania.

3. The catalyst for hydrotreating hydrocarbons as defined in claim 1, wherein said Group VI metal is at least one member selected from the group consisting of molybdenum and tungsten and said Group VIII metal is at least one member selected from the group consisting of cobalt and nickel.

4. The catalyst for hydrotreating hydrocarbons as defined in claim 1, wherein said Group VI metal is at least one member selected from the group consisting of molybdenum and tungsten, said Group VIII metal is at least one member selected from the group consisting of cobalt and nickel, and wherein said catalyst also contains an oxide of phosphorus.

5. The catalyst for hydrotreating hydrocarbons as defined in claim 1, wherein said mercapto-carboxylic acid represented by the general formula, HS—(CH₂)ₙ—COOR, is at least one member selected from the group consisting of mercaptoacetic acid, β-mercaptopropionic acid, alkali metal, alkaline earth metal and ammonium salts thereof, methyl mercaptoacetate, ethyl 2-mercaptoacetate, 2-ethylhexyl thioglycollate and methyl 3-mercaptopropionate.

6. The catalyst for hydrotreating hydrocarbons as defined in claim 1, wherein said bivalent mercaptan represented by the general formula, HS—R'—SH, is at least one member selected from the group consisting of ethanedithiol and 1,4-butanedithiol.

7. The catalyst for hydrotreating hydrocarbons as defined in claim 1, wherein said amino-substituted mercaptan represented by the general formula, H₂N—R'—SH, is at least one member selected from the group consisting of 2-aminoethanethiol and 4-aminothiophenol.

8. The catalyst for hydrotreating hydrocarbons as defined in claim 1, wherein said thiocarboxylic acid represented by the general formula, R''—COSH, is at least one member selected from the group consisting of thioacetic acid and thiobenzoic acid.

9. A method of activating hydrotreating catalysts for hydrocarbons which comprise an inorganic oxide carrier and a active component supported on said inorganic oxide carrier, said active component comprising (a) at least one member selected from the group consisting of oxides of metals in Groups VI and VIII of the Periodic Table, and (b) at least one organic compound having a mercapto radical, said organic compound being present in an amount equal to 1 to 3 equivalent proportions based on the weight required for converting said oxides of metals into sulfides, said organic compound being selected from the group consisting of mercapto-carboxylic acids represented by the following general formula:

$$HS-(CH_2)_n-COOR$$

wherein n is an integer from 1 to 3 and R denotes a hydrogen atom, an alkali metal, an alkaline earth metal, an ammonium group, or a linear, branched or naphthene hydrocarbonaceous radical of 1 to 10 carbon atoms; bivalent mercaptans represented by the following general formula:

$$HS-R'-SH$$

wherein R' is a bivalent hydrocarbonaceous radical; aminosubstituted mercaptans represented by the following general formula:

$$H_2N-R'-SH$$

wherein R' is a bivalent hydrocarbonaceous radical; and thiocarboxylic acids represented by the following general formula:

$$R''-COSH$$

wherein R'' is a monovalent hydrocarbonaceous radical; said method comprising contacting said catalyst with hydrogen at a temperature of room temperature to 400° C.

10. The method of activating hydrotreating catalysts for hydrocarbons as defined in claim 9, wherein said inorganic oxide carrier is made of a material selected from the group consisting of alumina, silica-alumina and titania.

11. The method of activating hydrotreating catalysts for hydrocarbons as defined in claim 9, wherein said Group VI metal is at least one member selected from the group consisting of molybdenum and tungsten and said Group VIII metal is at least one member selected from the group consisting of cobalt and nickel.

12. The method of activating hydrotreating catalysts for hydrocarbons as defined in claim 9, wherein said Group VI metal is at least one member selected from the group consisting of molybdenum and tungsten, said Group VIII metal is at least one member selected from the group consisting of cobalt and nickel, and wherein said catalyst also contains an oxide of phosphorus.

13. The method of activating hydrotreating catalysts for hydrocarbons as defined in claim 9, wherein said mercaptocarboxylic acid represented by the general formula, $HS-(CH_2)_n-COOR$, is at least one member selected from the group consisting of mercaptoacetic acid, β-mercaptopropionic acid, alkali metal, alkaline earth metal, ethyl 2-mercaptoacetate, 2-ethylhexyl thioglycollate and methyl 3-mercaptopropionate.

14. The method of activating hydrotreating catalysts for hydrocarbons as defined in claim 9, wherein said bivalent mercaptan represented by the general formula, $HS-R'-SH$, is at least one member selected from the group consisting of ethanedithiol, and 1,4-butanedithiol.

15. The method of activating hydrotreating catalysts for hydrocarbons as defined in claim 9, wherein said aminosubstituted mercaptan represented by the general formula, $H_2N-R'-SH$, is at least one member selected from the group consisting of 2-aminoethanethiol and 4-aminothiophenol.

16. The method of activating hydrotreating catalysts for hydrocarbons as defined in claim 9, wherein said thiocarboxylic acid represented by the general formula, $R''-COSH$, is at least one member selected from the group consisting of thioacetic acid and thiobenzoic acid.

17. The method of activating hydrotreating catalysts for hydrocarbons as defined in claim 9, wherein said temperature is in the range from 100° to 300° C.

* * * * *